R. SIEGFRIED.
ELECTRIC MOTOR.
APPLICATION FILED MAY 22, 1905.

917,806.

Patented Apr. 13, 1909.
2 SHEETS—SHEET 1.

WITNESSES:
C. L. Belcher
Otto S. Schairer

INVENTOR
Robert Siegfried
BY
Wesley G. Carr
ATTORNEY

R. SIEGFRIED.
ELECTRIC MOTOR.
APPLICATION FILED MAY 22, 1905.

917,806.

Patented Apr. 13, 1909.
2 SHEETS—SHEET 2.

WITNESSES:
C. L. Belcher
Otto S. Schairer.

INVENTOR
Robert Siegfried
BY
Wesley G. Carr
ATTORNEY

UNITED STATES PATENT OFFICE.

ROBERT SIEGFRIED, OF PITTSBURG, PENNSYLVANIA, ASSIGNOR TO WESTINGHOUSE ELECTRIC & MANUFACTURING COMPANY, A CORPORATION OF PENNSYLVANIA.

ELECTRIC MOTOR.

No. 917,806.

Specification of Letters Patent.

Patented April 13, 1909.

Application filed May 22, 1905. Serial No. 261,674.

*To all whom it may concern:*

Be it known that I, ROBERT SIEGFRIED, a citizen of the United States, and a resident of Pittsburg, in the county of Allegheny and State of Pennsylvania, have invented a new and useful Improvement in Electric Motors, of which the following is a specification.

My invention relates to electric motors and it has for its object to provide a motor of the direct current type with means whereby the brushes may be so located as to be readily accessible, whether the motor be suspended from above, supported from below or attached to a side wall, in case the number of brushes employed is less than the number of the field magnet pole pieces and with means whereby the commutator may be either covered or exposed, in operation.

Figure 1:
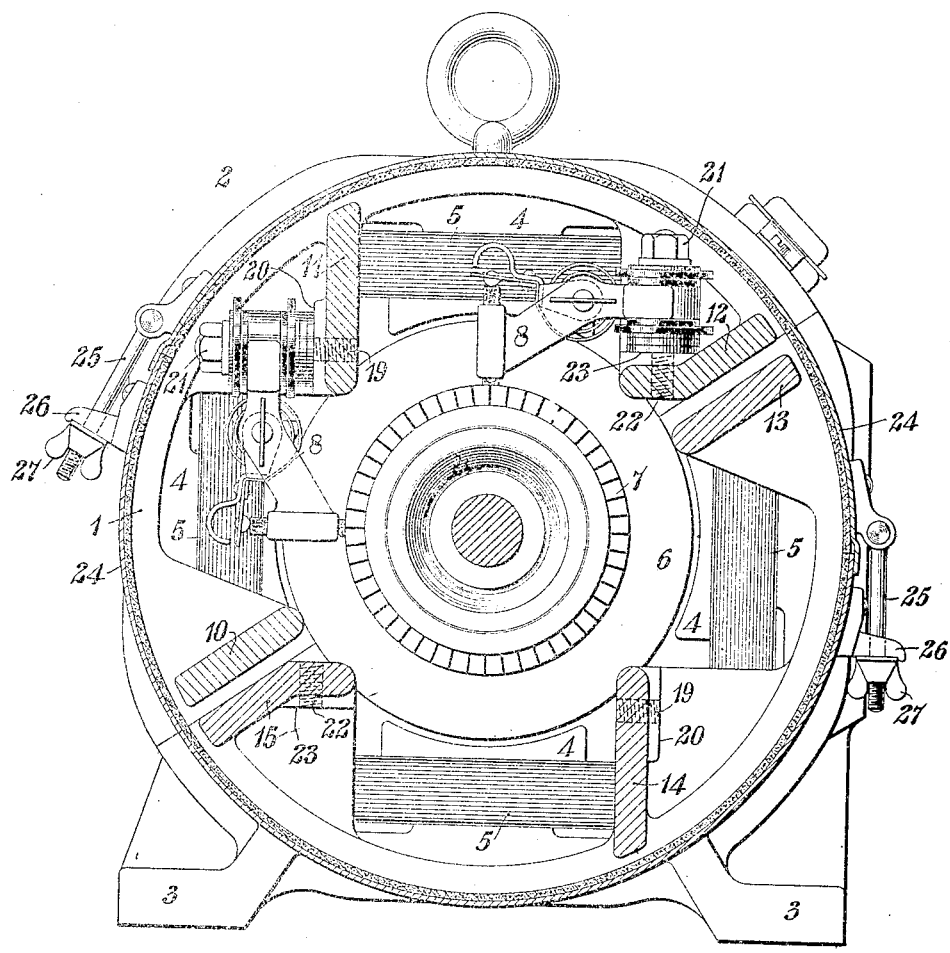
Figure 2:
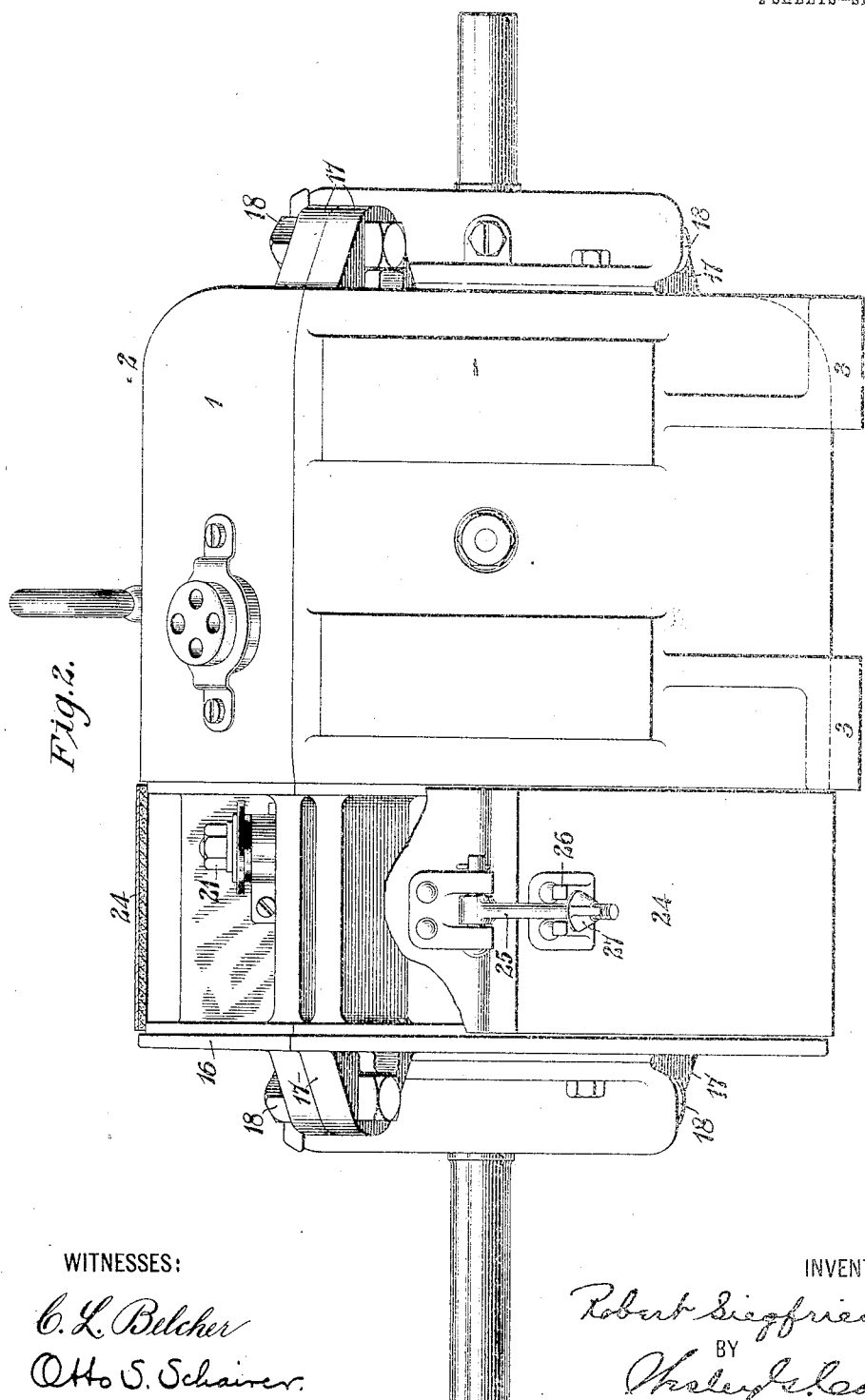

In the accompanying drawings, Figure 1 is a view, partially in end elevation and partially in section of a motor embodying my invention and Fig. 2 is a side elevation of the motor shown in Fig. 1, a portion of the commutator-inclosing band being broken away.

The present extensive use of electric motors in industrial operations necessitates their adaptation to widely varying conditions, both as regards the work to be performed and the locations to be occupied, it being sometimes necessary or advisable to mount such motors upon supporting bases, which may be either horizontal or vertical or at any angle between the two, and since frequent inspections of the commutator brushes may be desirable in order to make repairs or renewals, such location of the brushes as will facilitate access thereto is of considerable importance.

My present invention provides a convenient and inexpensive means whereby the commutator brushes may be so located as to be readily accessible and such means will be now described.

The field magnet frame 1 of the motor 2, is provided with feet 3, by means of which it may be attached to a proper supporting base either in the position indicated or in any other position, in accordance with the conditions of the service to which it is applied. As here shown the frame is provided with four pole pieces 4, two of which project horizontally and two vertically inward when the motor is in the position indicated in Fig. 1.

These pole pieces are provided with magnetizing coils 5, as is usual in this class of machines.

The armature 6, the commutator cylinder 7 and the brushes and holders 8, may be of any usual or desired construction, the latter being indicated as two in number.

The field magnet frame 1 is made in two sections, the plane of division between them being at an angle of substantially 34° to the plane of the bases of the supporting feet 3. The upper frame section is provided with three ribs, 10, 11 and 12 and the lower frame section is provided with three similar ribs, 13, 14 and 15, all of which are parallel to and slightly longer than the commutator cylinder and terminate at their outer ends in a two-part end ring or plate 16. The two parts of the frame are provided with end lugs 17 that are provided with bolts 18 by means of which the parts are clamped together.

Each of the ribs 11 and 14 is provided with screw threaded holes 19 and with a plane surface 20 against which a brush holder 8 may be clamped by means of bolts 21, the inner ends of which engage the holes 19. Each of the ribs 12 and 15 is also provided with screw threaded holes 22 and with a plane surface 23, the surfaces 23 of these ribs being parallel to each other, and at right angles to the surfaces 20, with which the bars 11 and 14 are provided and against which brush holders 8 may be clamped by means of bolts 21 which engage the screw threaded holes 22.

A sheet metal casing 24 for the commutator is made in two sections that may be provided with linings of felt or other yielding material and may be fastened together by means of hinged clamping bolts 25, ears or lugs 26 and thumb nuts 27. The sections are not fastened to the frame and hence the locking devices may be so located as to be readily accessible, irrespective of the position in which the motor is placed, and the sections may also be readily removed when desired.

When the motor is in the position indicated in the drawing, the brush holders are mounted upon the ribs 11 and 12, as indicated, and when so located, ready access may be had to them but if the motor is placed in any locality or position which will prevent ready access to the brushes when in the positions indicated, they may be readily attached to the ribs 14 and 15 or to any other two ribs that are 90° apart and thus be in such position that they may be readily inspected and be replaced or repaired if desired.

The specific details shown and described are not essential to the invention and I, therefore, desire to include in its scope such variations from what I show as do not change the mode of operation or result.

I claim as my invention:

1. In an electric motor, the combination with a field magnet frame that is open circumferentially at the commutator end and is provided with brush-supporting ribs, of a two-part cylindrical commutator cover, and means for clamping the cover parts together with their adjacent edges in any desired angular position with reference to the base of the motor.

2. In an electric motor, the combination with a field magnet frame that is open circumferentially at the commutator end and is provided with brush-supporting ribs, of two segmental cover plates for said open part and means for removably clamping said cover-plates together with the division lines in a plane making any desired angle with the base of the motor.

3. In an electric motor, the combination with a field magnet frame that constitutes a closed casing for the armature but is open around the periphery of the commutator cylinder, of two segmental sheet metal cover-plates for the open portion of the frame and bolts and nuts for clamping said parts together with their division-lines in a plane making any desired angle with the base of the motor.

4. In an electric motor, the combination with a field magnet frame having brush-supporting ribs projecting from its commutator end, of a circumferentially adjustable commutator cover comprising a plurality of segments, and means for clamping said segments together in any position to which the cover may be adjusted.

In testimony whereof, I have hereunto subscribed my name this 20th day of May, 1905.

ROBERT SIEGFRIED.

Witnesses:
B. M. WILLIAMS,
BIRNEY HINES.